(12) United States Patent
Alanen et al.

(10) Patent No.: US 7,246,010 B2
(45) Date of Patent: Jul. 17, 2007

(54) METHOD IN POSITIONING, A SYSTEM, AND AN ELECTRONIC DEVICE

(75) Inventors: Kimmo Alanen, Lemäälä (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 389 days.

(21) Appl. No.: 10/681,959

(22) Filed: Oct. 8, 2003

(65) Prior Publication Data
US 2004/0073365 A1 Apr. 15, 2004

(30) Foreign Application Priority Data
Oct. 8, 2002 (FI) .................................. 20021788

(51) Int. Cl.
*G01C 21/00* (2006.01)
(52) U.S. Cl. ...................... 701/213; 701/214
(58) Field of Classification Search ................ 701/200, 701/207, 208, 209, 213–216; 340/988, 994.24; 348/113, 116
See application file for complete search history.

(56) References Cited

U.S. PATENT DOCUMENTS

| | | | |
|---|---|---|---|
| 5,793,813 A | 8/1998 | Cleave | |
| 6,078,865 A * | 6/2000 | Koyanagi | 701/211 |
| 6,081,229 A | 6/2000 | Soliman et al. | |
| 6,144,335 A | 11/2000 | Rogers et al. | |
| 6,178,377 B1 * | 1/2001 | Ishihara et al. | 701/200 |
| 6,222,483 B1 | 4/2001 | Twitchell et al. | |
| 6,263,278 B1 * | 7/2001 | Nikiel et al. | 701/210 |
| 6,327,473 B1 | 12/2001 | Soliman et al. | 455/456 |
| 6,327,535 B1 | 12/2001 | Evans et al. | |
| 6,771,970 B1 * | 8/2004 | Dan | 455/456.1 |
| 6,898,518 B2 * | 5/2005 | Padmanabhan | 701/207 |

FOREIGN PATENT DOCUMENTS

| | | |
|---|---|---|
| EP | 1203965 | 5/2002 |
| WO | 9947943 | 9/1999 |
| WO | 99/56144 | 11/1999 |
| WO | 00/14560 | 3/2000 |
| WO | 00/19231 | 4/2000 |
| WO | 0212912 | 2/2002 |
| WO | 02/46786 | 6/2002 |
| WO | 02077661 | 10/2002 |

OTHER PUBLICATIONS

European Office Action for European Patent Application No. 03748166.0-2220 dated Apr. 21, 2006.

* cited by examiner

*Primary Examiner*—Richard M. Camby

(57) ABSTRACT

The present invention relates to a method in positioning, to determine assistance information of a satellite positioning system. The assistance information is transmitted in a communication system (1) with at least one server (4). The assistance information is transmitted from the communication system (1) to the electronic device (8). At least one server (4) of the communication system is used for determining the assistance information. The determined assistance information is converted to meta data format, and the assistance information converted to meta data format is transmitted to the electronic device (8). In the electronic device (8), said assistance information is used for positioning, when necessary. The invention also relates to a system and an electronic device, in which the method is applied.

14 Claims, 4 Drawing Sheets

```
301 ——<?xml version "1.0"?>
302 ——<!DOCTYPE auxiliarydata SYSTEM auxiliary.dtd>
     <auxiliarydata>
          <![CDATA[
              :
              :
          ]]>
304 ——</auxiliarydata>
303 ——<timedata>
          <![CDATA[
              :
              :
          ]]>
304 ——</timedata>
```

Fig. 3

METHOD IN POSITIONING, A SYSTEM, AND AN ELECTRONIC DEVICE

CROSS-REFERENCE TO RELATED APPLICATIONS

This application claims priority under 35 USC §119 to Finnish Patent Application No. 20021788 filed on Oct. 8, 2002.

FIELD OF THE INVENTION

The present invention relates to a method in positioning, in which assistance information is determined for a positioning system, and the determined assistance information is transmitted in a communication system with at least one server, and assistance information is transmitted to an electronic device. The invention also relates to a system comprising means for determining assistance information for a satellite positioning system, and a communication system comprising at least one server and means for transmitting assistance information to an electronic device. Furthermore, the invention relates to an electronic device with a positioning receiver, which electronic device is arranged to be used in a communication system comprising means for determining assistance information for a satellite positioning system, and a communication system comprising at least one server and means for transmitting assistance information to an electronic device.

BACKGROUND OF THE INVENTION

In positioning systems based on satellites, the positioning receiver attempts to receive signals transmitted from satellites, to compute its own position. Normally, the reception of at least four different satellite signals is needed to determine the three-dimensional position and the time data. However, satellite signals are relatively weak upon arrival at the receiver. The signal level is often below the level of background noise. In practice, this means that the positioning receiver cannot necessarily receive the required number of satellite signals. For such a situation, there are systems under development which utilize assistance information and mobile communication networks. In this case, assistance information related to the satellites is transmitted to the positioning receiver via base stations of a land mobile communication network. In such a system, at least some base stations are provided with a positioning receiver to receive signals transmitted from satellites. At the base station, the coordinates of the base station are known at a relatively high precision, wherein the satellite signals received at the base station and the coordinates of the base station can be used to determine some information relating to the satellite signals, such as the propagation time from the satellite to the base station and the ionospheric corrections. Furthermore, it is possible to transmit assistance information, such as Ephemeris and almanac data, from an earth station belonging to the satellite positioning system to the base stations. In this case, the assistance information can be utilized in the positioning to use also such a satellite signal whose strength is not sufficient for the demodulation of the information in the signal. This will facilitate the positioning under poor signal conditions.

One known positioning system based on satellites (satellite positioning system) is the Global Positioning System (GPS) comprising several satellites orbiting the earth. Each operating satellite of the GPS system transmits a so-called L1 signal at the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo random sequence. This pseudo random sequence is different for each satellite. In each satellite, for modulating the L1 signal, the pseudo random sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to generate different C/A codes by using identical code generators. The C/A codes are thus binary codes whose chipping rate in the GPS system is 1.023 Mchips/s. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc. In the GPS system, the codes used in the modulation of the L1 signal are not particularly efficient in view of eliminating the above-presented narrow-band interference. Thus, the cross-correlation caused by a strong spurious signal in the weaker signal to be received may prevent the receiver from acquiring this signal to be received.

International patent application WO 99/47943 presents a system and a method for determining the position of a wireless CDMA transceiver. The publication presents typical transmission of assistance information to a receiver in the case of satellite positioning. The assistance information can be satellite identification data, Dopper shift data, information related to the distance between the base station and the satellite, or information related to a search window. The search window can be determined on the basis of the round trip delay between the receiver and the base station, or information related to the angle of the satellite. In the system according to the reference, the base station is provided with a GPS receiver which the base station can use to acquire information relating to satellite signals, for example to determine the distance between the satellite and the base station.

One problem in systems of the above-described kind is that the implementation of the system requires modifications in the mobile communication network, for example for the reason that at least some base stations must be provided with a positioning receiver. Furthermore, the system is bound to the communication protocol used on the transmission channel of the mobile communication network, and the implementation of the physical layer. Also, the operator of the mobile communication network must implement the transmission of the assistance information in the mobile communication network. Furthermore, the use of the system requires that the user's electronic device is provided not only with the positioning receiver but also a receiver functioning in such a mobile communication network. Consequently, it is a system bound to a specific communication network and protocol. The implementation of such a system is relatively expensive, and the use of the system is limited to the subscribers of this mobile communication network only.

SUMMARY OF THE INVENTION

It is an aim of the present invention to provide an improved method and system for use in positioning. Furthermore, it is an aim of the invention to provide an electronic device utilizing the method and the system. The invention is based on the idea that assistance information is presented in some meta data format, and assistance information in such format is transmitted via a communication network to the electronic device. To put it more precisely, the method according to the present invention is primarily characterized in that at least one server of the communication system is used for determining assistance information, the determined assistance information is converted to a meta data format, and the assistance information converted to the meta data format is transmitted to the electronic device, wherein said assistance information is used in the electronic device for positioning, when necessary. The system according to the invention is primarily characterized in that at least one server of the communication system comprises means for determining assistance information, and means for converting the determined assistance information to a meta data format, wherein said means for transmitting assistance information comprise means for transmitting the assistance information in the meta data format to the electronic device, and the electronic device comprises means for using the assistance information in the meta data format for positioning, when necessary. Furthermore, the electronic device according to the invention is primarily characterized in that the electronic device comprises means for receiving assistance information transmitted in a meta data format to the electronic device, and means for using the assistance information in the meta data format for positioning, when necessary.

The present invention shows remarkable advantages over solutions of prior art. When applying the method according to the invention, it is largely possible to utilize information systems already existing, wherein the use of the assistance information is not bound to the communication system for which the user of the positioning receiver has entered a subscriber contract. This expands the possibilities to use the system, wherein the number of the users of the system may easily become higher than the number of the users of the system for transmitting assistance information bound to a given mobile communication network. Furthermore, the use of the system does not require expensive hardware investments, because it is not necessary to construct positioning receivers to receive satellite signals at the base stations, but the system utilizes positioning receivers provided for some servers. Also, the use of different transmission channels does not require a separate transmission protocol for the assistance information, but the transmission protocol for the assistance information is independent of the transmission channel. In view of the invention, the servers of the system do not need, for example, mobile communication means, but it is sufficient that the servers are connected to a communication network, such as the Internet data network. In spite of this, assistance information can also be transmitted to mobile stations, because mobile communication networks generally have a connection to the Internet data network. The Internet data network can also be provided with services, by means of which the user of an electronic device can request that assistance information according to the invention is transmitted to the electronic device. In this case, the assistance information transmission service can be restricted to be available to specific users only, if necessary.

DESCRIPTION OF THE DRAWINGS

In the following, the invention will be described in more detail with reference to the appended drawings, in which FIG. 3 shows an example of the way of presenting assistance information used in an advantageous embodiment of the invention.

DETAILED DESCRIPTION OF THE INVENTION

In the following description of a method according to an advantageous embodiment of the invention, a data network 2 using the TCP/IP protocol in data transmission and the GSM mobile communication network will be used as examples of the communication system and a wireless communication network 3, respectively, but it will be obvious that the present invention is not restricted to be used in these communication networks only. Furthermore, the GPS system will be used as an example of a positioning system, but the invention can also be applied in connection with other satellite positioning systems.

Figure 1:
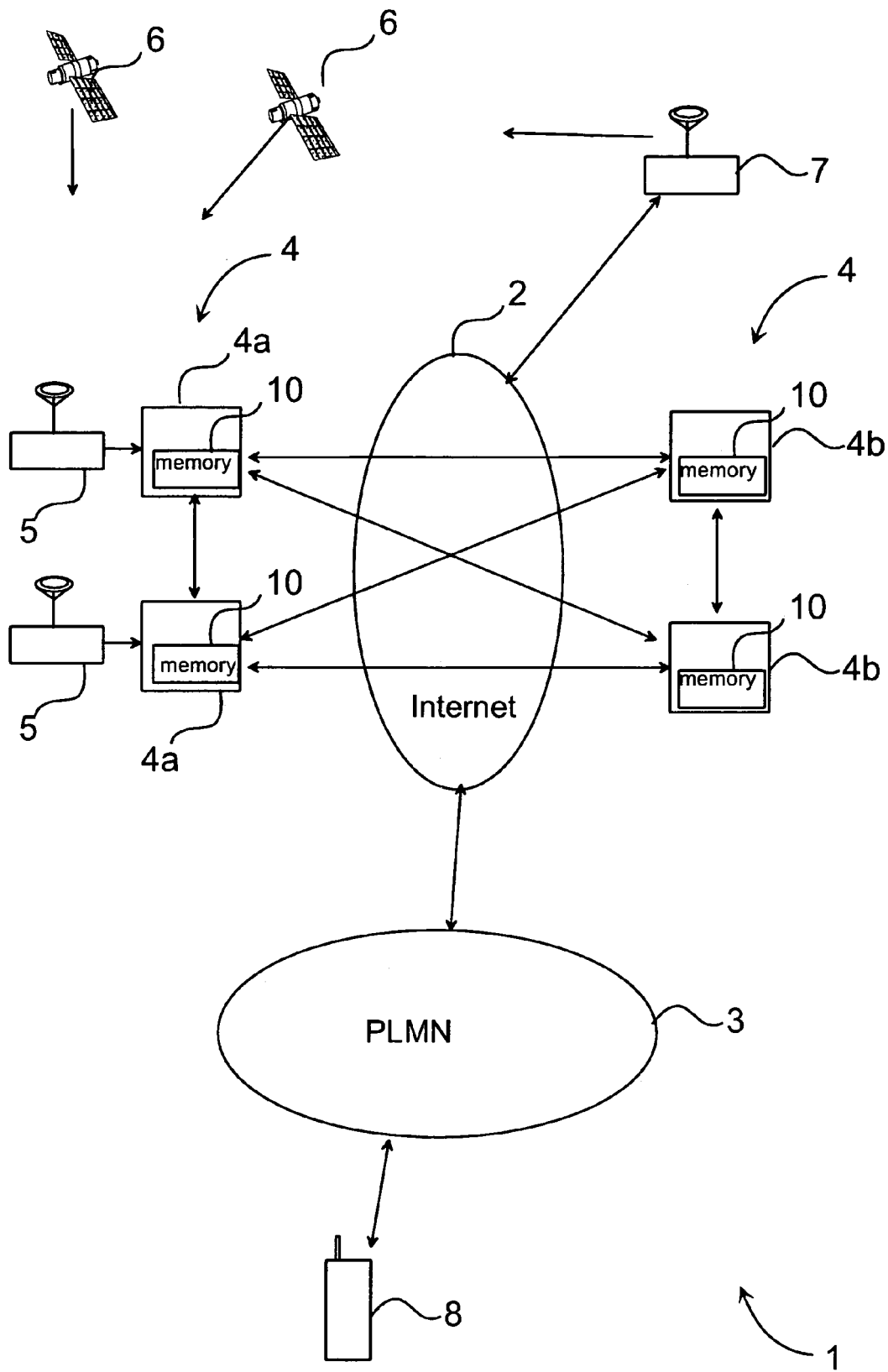
FIG. 1 shows a system according to an advantageous embodiment of the invention in a reduced chart.
Figure 2:
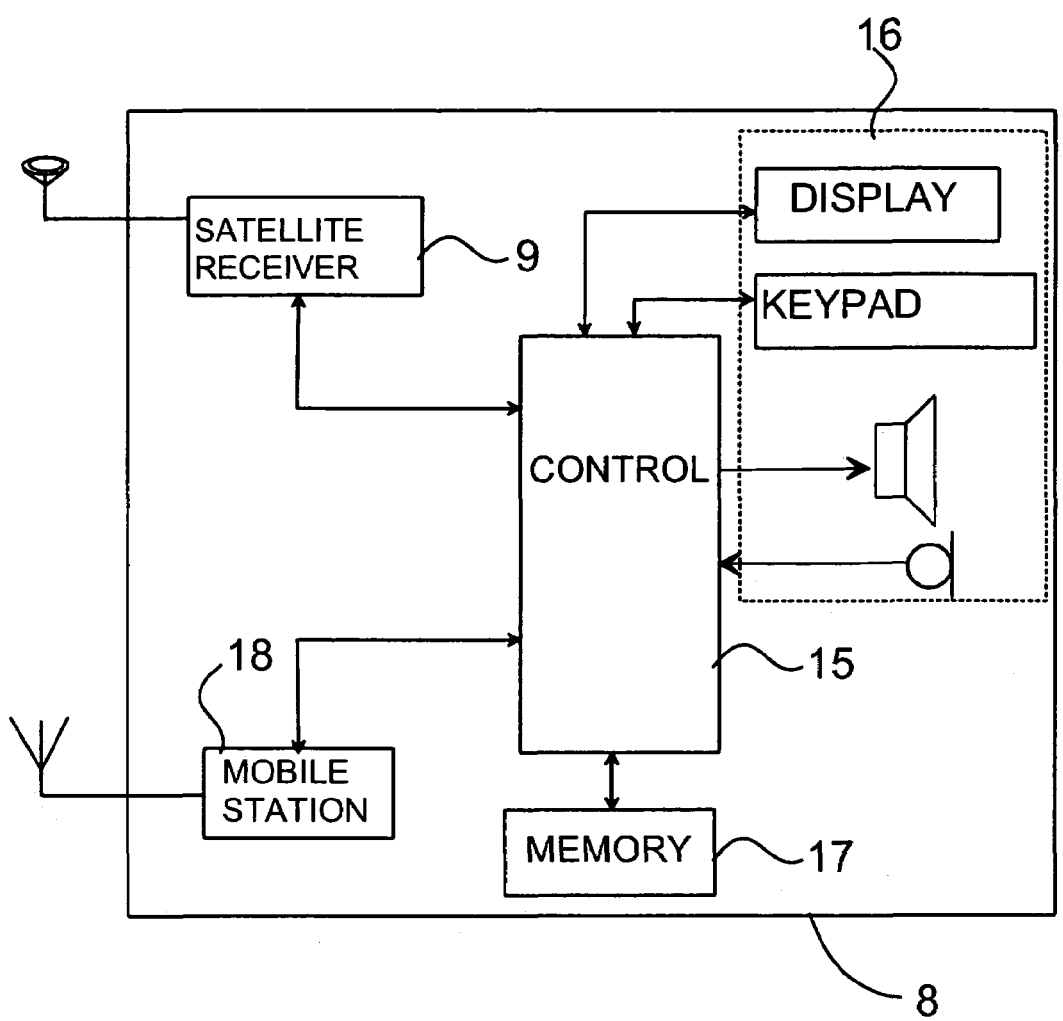
FIG. 2 shows a positioning receiver according to a preferred embodiment of the invention in a reduced block chart.

The system 1 presented in FIG. 1 comprises a first communication network 2, in which data is preferably transmitted in packets complying with the TCP/IP protocol. The communication network is provided with servers 4, of which at least one comprises a server positioning receiver 5. This server positioning receiver 5 can be used to receive a signal from satellites 6. Because the position of the server positioning receiver 5 is substantially constant and it is known at a relatively high precision, the signals received from the satellites 6 can be used to compute some parameters of assistance information, such as ionospheric corrections. Under sufficiently good conditions, the server positioning receiver 5 can also be used to demodulate navigation data transmitted in the satellite signal, wherein also this navigation data can be used for forming assistance information. On the other hand, navigation data can also be stored in the server 4, and/or navigation data is transmitted to the server 4 from another data processing device, for example an earth station 7 belonging to the satellite positioning system, or the like. Assistance information can be transmitted from the server 4 to such electronic devices 8 which are provided with a positioning receiver 9 (FIG. 2).

The electronic device 8 according to an advantageous embodiment of the invention comprises, in addition to the positioning receiver 9, also a control block 15 for controlling the functions of the electronic device, a user interface 16 for using the electronic device 8, and a memory 17 for storing software, data, such as assistance information, etc. In addition, the electronic device 8 comprises at least one set of communication means 18, for example mobile communication means, by which the electronic device 8 can communicate with the communication network 2 either directly or via another data network, such as the mobile communication network 3. The electronic device 8 can be, for example, a wireless terminal, a mobile station, a computer, etc.

In a system according to an advantageous embodiment of the invention, the servers 4 are used in a way similar to a distributed data network, wherein the servers 4 can transmit e.g. data related to assistance information to each other. This makes it possible that a separate positioning receiver 5 is not needed for each server 4, wherein extensive modification measures will not be needed in these servers. Furthermore, a server 4 with no positioning receiver 5 will not be loaded by receiving satellite signals. In the distributed system, the tasks to transmit assistance information can also be shared by different servers, if necessary, for example in the following way. A server 4 with a positioning receiver 5 does not transmit assistance information directly to the electronic devices 8 which use it, wherein the loading of this server 4 can be reduced to some extent. From such a server, assistance information or information necessary for forming it is transmitted to one or several other servers in the first data network 2. In the system according to this embodiment, preferably servers 4 including no positioning receiver 5 are used as the terminals for transmitting assistance information to the electronic devices 8. This arrangement has, for example, the advantage that the load caused by the positioning functions is distributed more evenly between the different servers 4. As the servers 4, it is possible to use various data processing devices, such as for example a so-called personal computer (PC), a UNIX computer, a telecommunication terminal (for example a phone), or the like. The server functions are implemented in the computer by using an operating system suitable for this purpose. A non-restricting example to be mentioned in this context, in addition to the above-mentioned UNIX operating system, is the Linux operating system. When a telecommunication terminal is used as the server 4, the assistance information can be advantageously transmitted as a data call from the server 4 to the electronic device 8.

In the system according to the present invention, the assistance information is presented by using a so-called meta data format, such as the extensible markup language (XML), to define a specific presentation format for the assistance information. In this case, several different data transmission channels and protocols can be used to transmit assistance information between the servers 4 as well as between the servers 4 and the electronic devices 8, wherein the usability of the system can be significantly improved in comparison with solutions of prior art. Within the scope of the present invention, it is also possible to use any other meta data format than the above-mentioned extensible markup language for presenting the assistance information. Some non-restrictive examples of such meta data formats to be mentioned in this context include the hypertext markup language (HTML) and the wireless binary XML (WBXML). At the transmission stage, the assistance information in the meta data format is included in messages complying with the transmission protocol of the communication network used at the time, and at the receiving stage, the assistance information in the meta data format is demodulated from the messages of the transmission protocol. In the receiving device, the assistance information can then be determined and used for positioning. This presentation method based on a specific meta data format has the advantage that the system is not dependent on a specific service provider but it is possible to connect servers 4 of several different service providers to the system, to transmit assistance information to the other servers 4 as well as to the electronic devices 8.

FIG. 3 shows a reduced and non-restrictive example of presenting assistance information in meta data format. The meta data format comprises meta data attributes 301, such as the meta data version number as well as the name of the data group for example for storage purposes. The meta data format also comprises the actual assistance information converted in the meta data format. This assistance information field preferably comprises initial tags 301 which define the content of the data following the tag, data fields, such as assistance information fields 302 and time data fields 303, and end tags 304 which indicate the end of the data field. The data fields 302, 303 may comprise specifying attributes about the data relating to each data field, for example assistance information or time information. The assistance information field 302 may comprise, for example, Ephemeris data, almanac data, data about the satellite whose assistance information is involved, as well as correction data of the universal time co-ordinated (UTC), indicating the difference between the UTC and the time of the satellite positioning system. The time data field 303 can be used for correcting the time data between the electronic device 8 in a way which will be described in more detail below in this description. In the data fields, the data is preferably presented in ASCII format. However, it will be obvious that within the scope of the present invention, the data can also be presented in another format. For example, the data can be encoded in binary format, for example in the wireless binary XML format (WBXML). The data in the data fields can also be encoded in another meta data format, such as the HTML, but other meta data formats can be applied as well.

The following is a description on the operation of the method according to a preferred embodiment of the invention in an example system as shown in FIG. 1. Let us assume that the system 1 comprises servers equipped with a positioning receiver 5 and servers which are not equipped with a positioning receiver. For the sake of clarity, the non-restrictive terms positioning server and communication server will be used below in this description to refer to servers equipped with a positioning receiver 5 and other servers, respectively. However, it will be obvious that the invention can also be applied in systems in which all the servers are provided with a positioning receiver. The invention can also be applied in such systems in which no server is provided with a positioning receiver. In this case, the assistance information must be supplied to the servers from another source. In FIG. 1, the positioning servers are indicated with the reference 4a and the communication servers with the reference 4b.

The positioning servers 4a attempt to receive a signal from one or more satellites and to use these signals to determine correction data, for example, to correct the effect of the atmosphere on the signal propagation. The positioning server 4a may also demodulate the navigation data transmitted in the signal received by it, if the signal strength is sufficient. The positioning receiver 4a uses this information to generate assistance information in meta data format and to store it in its memory 10. The positioning server 4a may also normally use the received signals and/or the demodulated navigation data to determine the time data of the satellite positioning system, which may also be included in the assistance information. Furthermore, the positioning server 4a may transmit the assistance information determined by it to other servers coupled to the communication network 2, such as the communication servers 4b.

In electronic devices 8, the assistance information of the system can be used for positioning preferably in the following way. The positioning receiver 9 of the electronic device tries to perform acquisition of such satellite signals whose strength is sufficient for the acquisition. This is not always possible to receive the required four or more signals from different satellites. In this case, acquisition may be attempted by means of assistance information, wherein the assistance information is used to make a rough estimate of the code phase of the satellite signal. When the code phase is roughly known, the acquisition means 11 of the positioning receiver 8 (FIG. 2) can be set in such a way that they try to determine the correct code phase in the vicinity of the rough code phase. In the acquisition, for example correlation methods are used, wherein the positioning receiver generates a code corresponding to the spreading code used in the generation of the signal to be received, and makes the correlation. The correct code phase is indicated as a peak in the correlation result, wherein the timing of this peak is used to make the code phase more accurate. If necessary, the correlation time can be slightly extended to improve the correlation.

At the stage when assistance information is needed in the electronic device 8, the following steps are taken in the method according to another advantageous embodiment of the invention. A request for assistance information, or the like, is transmitted from the electronic device 8 to the data network 2, for example via the mobile communication network 3, via a wireless local area network, a public land communication network, or the like. The message is transmitted to such a communication server 4b in which assistance information is stored.

The communication connection to be set up via the mobile communication network 3 can be, for example, a connection according to the so-called WAP protocol, by means of which the electronic device can be used, for example, to browse information in the Internet network, such as www pages of companies and other sites where data is stored. Thus, in the electronic device 8, address data is retrieved from memory means 17, so that a data transmission connection can be set up to said communication server 4b which maintains assistance information. In the mobile communication network 3, the messages are preferably converted to messages complying with the internet protocol (IP) and transmitted further to a data network 2, such as the Internet data network, in a way known as such. The identifier of the electronic device 8 which transmitted the message is also included in the messages, wherein the response messages can be transmitted back to the electronic device 8 which transmitted the request. Another example that can be mentioned in this context is the use of short messages (SM) in the transmission of positioning data and possible assistance information.

In some situations, the setting up of a communication connection with a database server S may also be performed, for example, by applying a wireless local area network WLAN (not shown). In this case, a data transmission connection is set up from the electronic device 8 to a wireless local area network in the vicinity of the electronic device 8, through which a connection can further be made to the data network 2.

Figure 4:
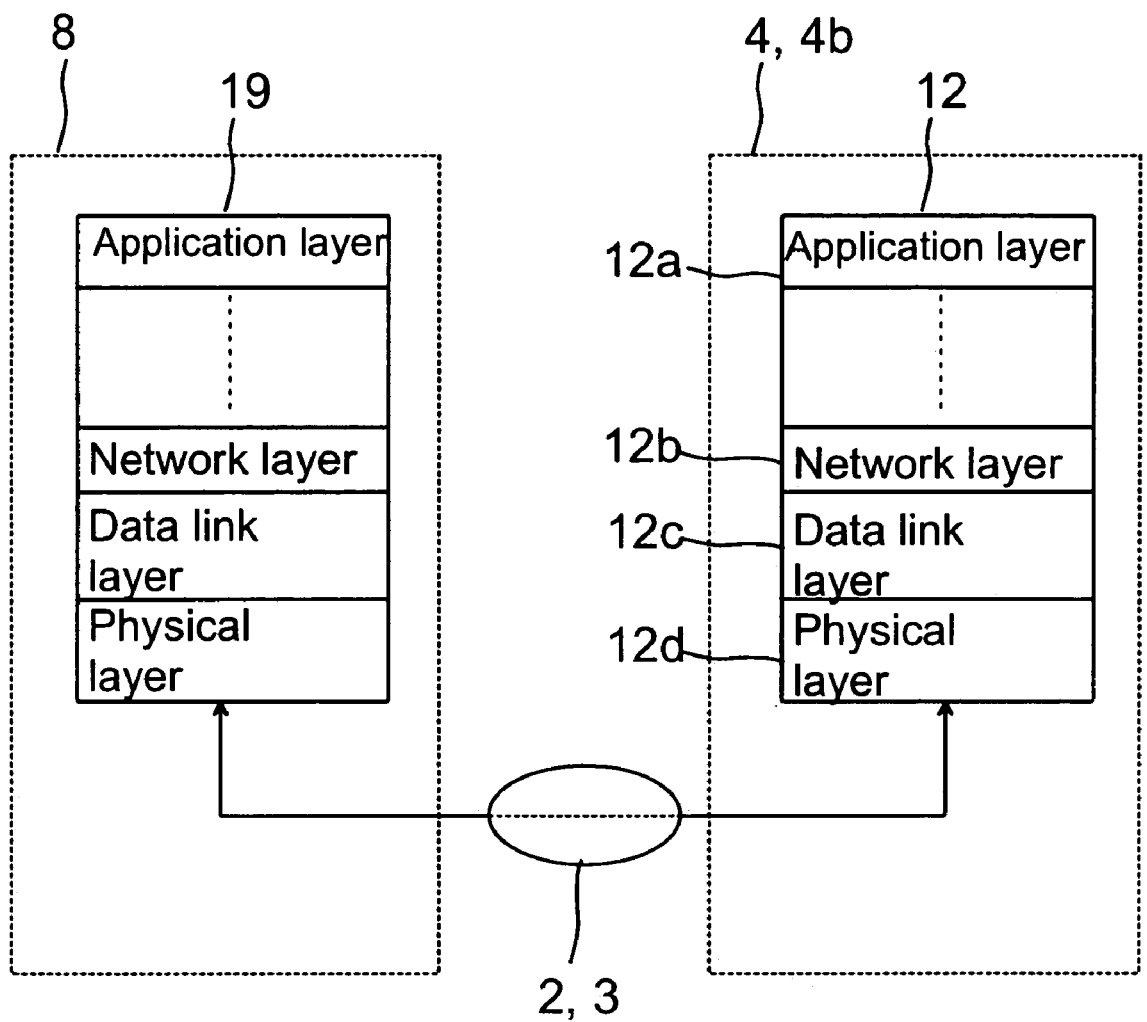
FIG. 4 shows, in a reduced manner, an advantageous example of a protocol stack which can be used in the transmission of assistance information in a system according to an advantageous embodiment of the invention.

In the data network 2, the messages are transmitted, in a way known as such, by means of the message transmission mechanisms of the data network 2 to a target address, in this case a communication server 4b, in which said assistance information is stored. The communication server 4b interprets the received message and retrieves assistance information from the memory 10. After this, the communication server 4b generates a response message comprising said assistance information in meta data format and converts it to a reply message to be transmitted to the data network. In this conversion, a protocol stack 12 is preferably used, of which one example is shown in FIG. 4. In the protocol stack 12 of the server, the assistance information in meta data format is framed on the level of the application layer 12a to generate message structures complying with the lower layers of the protocol stack (network layer 12b, data link layer 12c) in a way known as such. After this, packets of the data link layer 12c can be transmitted via the physical layer 12d, i.e. the transmission channel, to the data network 2. In the data network, the message is routed to the data network, such as the mobile communication network 3, to which the electronic device 8 is connected or to which a connection can be arranged. The data network transmits the reply message to the electronic device 8, in which a corresponding protocol stack structure 19 is implemented. After this, in the electronic device MS, the received assistance information is stored in the memory means 13 and, if necessary, positioning is performed is the positioning receiver 9.

In this context, it should be mentioned that the term connection does not refer solely to such data transmission connections in which the physical connection must be on all the time during the data transmission (a so-called connection-oriented connection), but the connection also refers to such data transmission connection in which the data transmission does not require a continuous connection (a so-called connectionless connection). Such connectionless connections include, for example, packet-switched connections, such as connections of the GPRS packet network and the data transmission mechanisms used in the transmission of short messages (SM).

In a system according to an advantageous embodiment of the invention, assistance information in meta data format can be used to set the time data of the electronic device 8 to corresponds to the time data of the satellite positioning system at a relatively high precision. This precision of the time data is significant in view of the accuracy of the positioning. The time data can be preferably set in the following way. One or more such meta data fields are determined which request the transmission of another document from the server to the electronic device 8. Thus, the electronic device 8 transmits to the server 4, for example a communication server 4b, a request to transmit such a file (document or the like) in meta data format which contains a time data field including information about the time of the satellite positioning system (for example the GPS time), as well as a meta data field with a request to transmit another document. When the communication server 4b receives the request from the electronic device 8 to transmit the document including the time data, the communication server 4b starts a timer 14 or the like and sends the document. At the stage when the electronic device 8 receives said document, said meta data field including the request to transmit another document will cause that a new message is transmitted from the electronic device 8 to the communication server, requesting the transmission of this second document. After receiving this message, the communication server 4b stops the timer 14, wherein the timer 14 indicates the time that was passed in the back-and-forth transmission between the communication server 4b and the electronic device 8, that is, the so-called round trip delay. The communication server 4b transmits information about the round trip delay to the electronic device 8, wherein it can correct its own time data to comply with the time data of the satellite positioning system, by using first the time data received in the document and then the round trip delay informed by the communication server 4b. By the above-described method, it is thus possible to compensate for the time passed in the transmission of the assistance information at a relatively high precision, wherein the electronic device can attain time data in which the error is not more than a few seconds, preferably not more than about 3 s. If necessary, the above-described arrangement can also be used to compensate for the round trip delay between the positioning server 4a and the communication server 4b, for example in situations in which the communication server 4b receives the time data of the satellite positioning system from the positioning server 4a.

The system according to the present invention can be implemented in such a way that new servers 4 can be easily connected to the system, wherein it is possible to expand the system. The system can be implemented even in a worldwide manner. It is possible to transmit up-to-date assistance information to all the servers 4 from the other servers 4 in the system. Thus, the user can receive assistance information to his/her electronic device 8 substantially irrespective of his/her position, if a data transmission connection can be set up between the electronic device 8 and the data network 2. Moreover, no information about the address of the positioning server 4a will be needed in the electronic device 8, but it will suffice that the electronic device 8 has information about the address of a communication server 4b.

Although it has been presented above that the method according to the invention makes it possible to widely use assistance information, the invention can also be applied in such a manner that the use of the service is limited to specific users only. Herein it is possible to utilize for example a service provided in the Internet data network, through which the user of the electronic device 8 can request assistance information to be transmitted to the electronic device 8. To use the service, a registration may be required, wherein it is not possible to download assistance information for other than registered users. Furthermore, the system may comprise several providers of assistance information transmission services, which may each have their own requirements for using the service. However, assistance information can also be transmitted between the servers of these different service providers, because a specific meta presentation format is defined for the assistance information in the system according to the invention.

It is obvious that the present invention is not limited solely to the above-presented embodiments but it can be modified within the scope of the appended claims.

The invention claimed is:

1. A method in positioning, in which assistance information of a satellite positioning system is determined, and the assistance information is transmitted to an electronic device, wherein at least one server of the communication system is used for determining the assistance information, the determined assistance information is converted to a meta data format, and the assistance information converted to the meta data format is transmitted to the electronic device, wherein said assistance information is used in the electronic device for positioning, when necessary, wherein for the transmission of the assistance information in the communication network, at least two servers are used, that said at least two servers are divided into a first set of servers and a second set of servers, wherein the servers of the first set are used for receiving satellite signals, generating assistance information on the basis of the received satellite signals, and transmitting the assistance information to at least one server of said second set, and that the assistance information is transmitted to the electronic device from a server of said second set.

2. The method according to claim 1, wherein the time data of the satellite positioning system is determined, said time data is converted to a meta data format, the time data is transmitted from the server of the communication system to the electronic device, wherein reception data about the reception of the time data is transmitted from the electronic device, the time passed between the transmission of the time data and the reception of the reception data is measured at the server to determine a round trip delay, and information about the round trip delay is transmitted to the electronic device, wherein the received time data and the information about the round trip delay are used in the electronic device to set the time data of the electronic device to correspond with the time data of the satellite positioning system.

3. The method according to claim 1, wherein an extensible markup language is used as said meta data format.

4. The method according to claim 1, wherein said assistance information comprises Ephemeris data, almanac data, data about the satellite whose assistance information is involved, as well as correction data for the time data, indicating the difference between the time data of the satellite positioning system and the Universal Time Co-ordinated.

5. The method according to claim 1, wherein said assistance information is transmitted in packets complying with the TCP/IP protocol in the communication system.

6. A system comprising means for determining assistance information of a satellite positioning system, and a communication system comprising at least one server and a transmitting assistance information to an electronic device, wherein, at least one server of the communication system comprises said element for determining assistance information, and a converting element for converting the determined assistance information to a meta data format, wherein said means for transmitting element for transmitting assistance information comprise an element for transmitting the assistance information in meta data format to the electronic device, and the electronic device comprises an element for using the assistance information in meta data format for positioning, when necessary, said system comprising at least two servers for transmitting assistance information, said at least two servers are divided into a first set of servers, and a second set of servers, wherein the servers of the first set comprise a receiver for receiving satellite signals, a generator for generating assistance information on the basis of the received satellite signals, and a transmitter element for transmitting the assistance information to at least one server of said second set, and that the assistance information is arranged to be transmitted to the electronic device from the servers of said second set.

7. The system according to claim 6, comprising a for determining element for determining time data of a satellite positioning system, a converting element for converting said time data to a meta data format, a transmitting element for transmitting the time data from a server of the communication system to an electronic device, wherein reception data about the receipt of the time data is arranged to be transmitted from the electronic device, and which system comprises a measuring element for measuring the time passed between the transmission of the time data from the server and the reception of the reception data at the server to determine a round trip delay, wherein information about the round trip delay is arranged to be transmitted to the electronic device, wherein the electronic device comprises an element for using the received time data and information about the round trip delay to set the time data of the electronic device to comply with the time data of the satellite positioning system.

8. The system according to claim 6, wherein an extensible markup language is arranged to-be used as said meta data format.

9. The system according to claim 6, said assistance information comprising Ephemeris data, almanac data, data about the satellite whose assistance information is involved, as well as correction data for the time data, indicating the difference between the time data of the satellite positioning system and the Universal Time Co-ordinated.

10. The system according to claim 6, wherein said assistance information is arranged to be transmitted in packets complying with the TCP/IP protocol in the communication system.

11. The system according to claim 6, the meta data format to be used in the presentation of assistance information comprising at least attributes of the meta data, an assistance information field comprising initial tags, data fields and end tags.

12. The system according to claim 6, comprising a wireless communication network, and the electronic device used is a wireless communication device, wherein said assistance information is arranged to be transferred to the electronic device by means of said wireless communication network.

13. An electronic device comprising a positioning receiver and which electronic device is arranged to be used in a communication system comprising a determining element for determining assistance information of a satellite positioning system, and the communication system comprising at least one server and a transmitting element for transmitting assistance information to the electronic device, electronic device comprising a receiving element for receiving assistance information transmitted in meta data format to the electronic device, and an element for using the assistance information in meta data format for positioning, when necessary, said device further comprising a receiver for receiving time data of a satellite positioning system from a server of the communication system, determined and converted to a meta data format by the system, a determining element for determining reception data about the receipt of the time data, a transmitting element for transmitting said reception data from the electronic device, and a receiving element for receiving information about the round trip delay from the system, determined by the system by measuring the time passed between the transmission of the time data from the server and the reception of the reception data at the server, the electronic device further comprising a setting element for using the received time data and information about the round trip delay to set the time data of the electronic device to comply with the time data of the satellite positioning system.

14. The electronic device according to claim 13 comprising a receiving element for receiving said assistance information from a wireless communication network.

* * * * *

UNITED STATES PATENT AND TRADEMARK OFFICE
CERTIFICATE OF CORRECTION

PATENT NO. : 7,246,010 B2  Page 1 of 1
APPLICATION NO. : 10/681959
DATED : July 17, 2007
INVENTOR(S) : Alanen et al.

It is certified that error appears in the above-identified patent and that said Letters Patent is hereby corrected as shown below:

1. On the Title page at INID (75), "Lemäälä" should be --Lempäälä--.
2. In column 10, line 19, "means" should be --a determining element--.
3. In column 10, line 22, after "transmitting" --element for transmitting-- should be inserted.
4. In column 10, line 27, "means for" should be deleted.
5. In column 10, line 43, "for" should be deleted.
6. In column 10, line 62, "to-be" should be --to be--.
7. In column 11, line 24, before "electronic" --the-- should be inserted.

Signed and Sealed this

Sixth Day of January, 2009

JON W. DUDAS
*Director of the United States Patent and Trademark Office*